Feb. 3, 1959 P. BOYD-BRENT 2,871,956
SOFT GROUND CULTIVATOR ATTACHMENT FOR TRACTORS AND THE LIKE
Filed Sept. 18, 1953 3 Sheets-Sheet 2
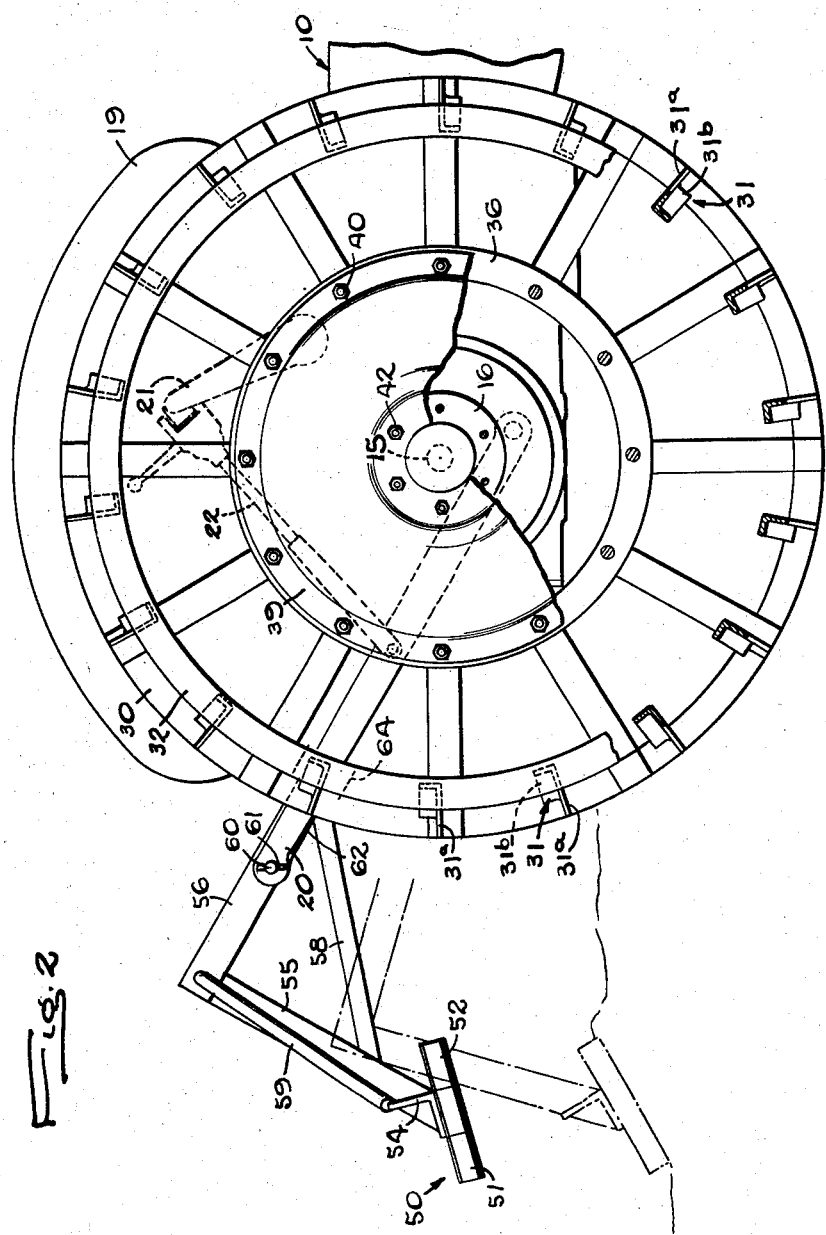
INVENTOR
Peter Boyd-Brent
by Carlson, Pitzner, Hubbard & Wolfe
ATTORNEY

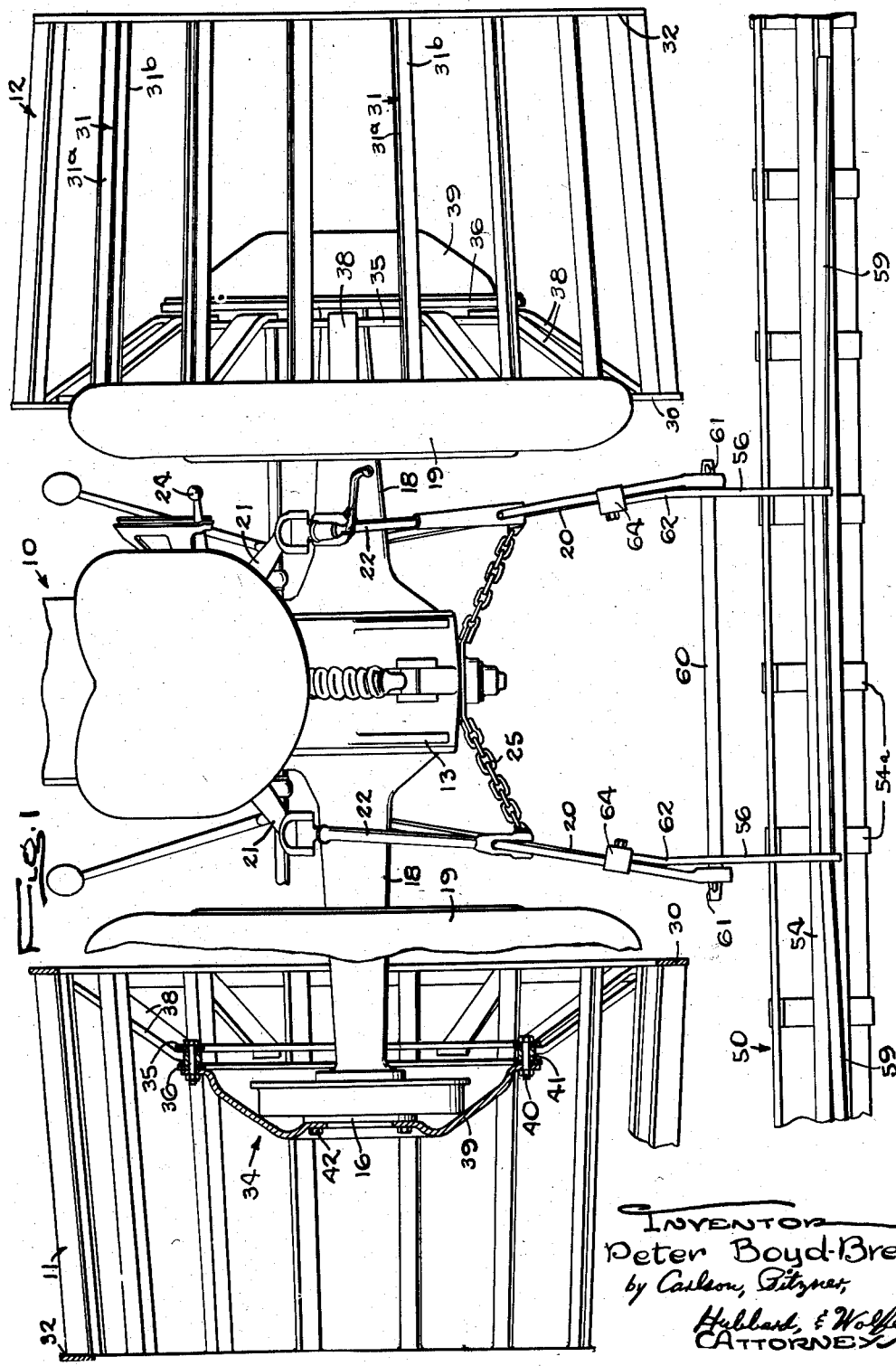

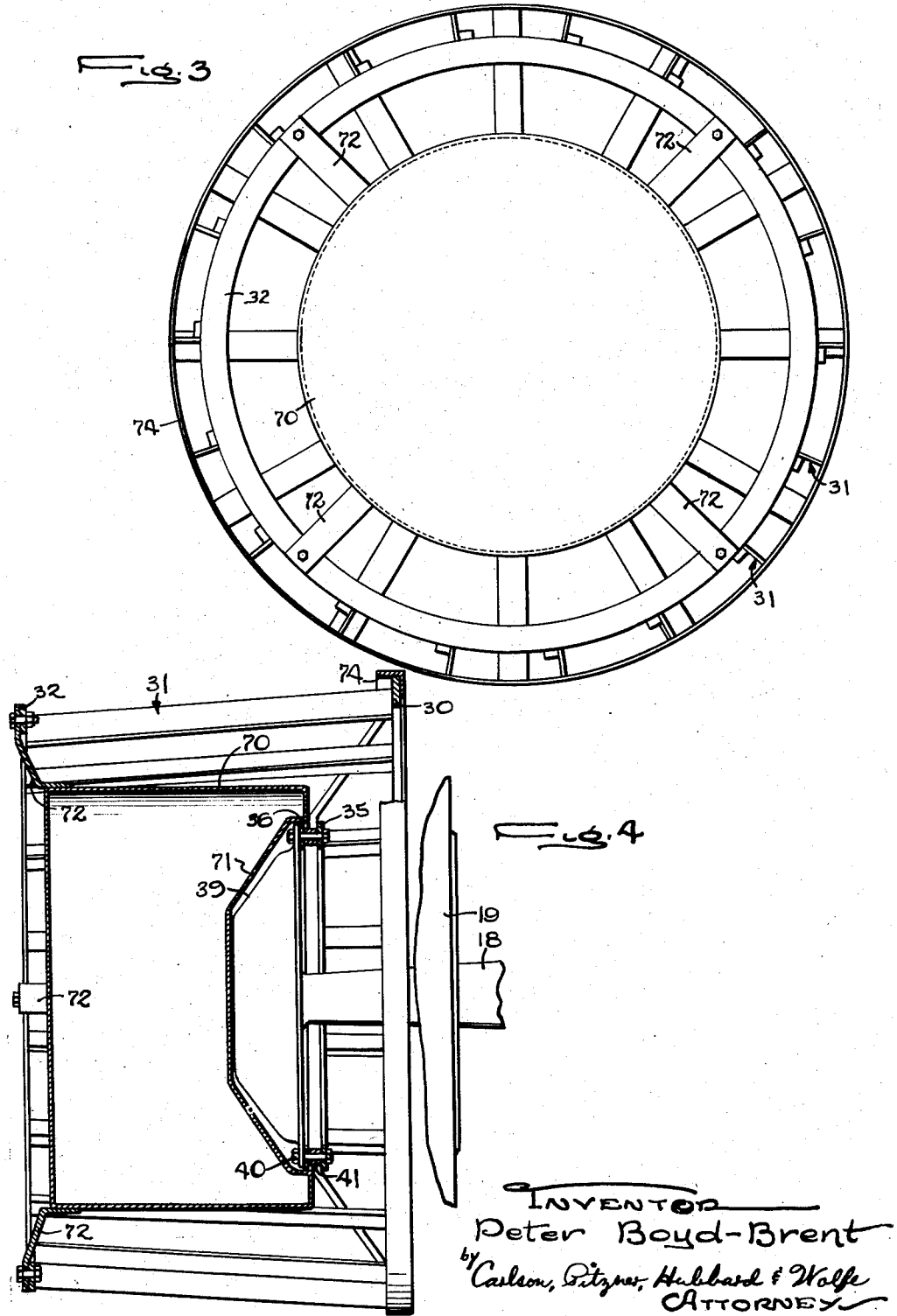

United States Patent Office 2,871,956
Patented Feb. 3, 1959

2,871,956

SOFT GROUND CULTIVATOR ATTACHMENT FOR TRACTORS AND THE LIKE

Peter Boyd-Brent, Tamworth-in-Arden, England, assignor to Harry Ferguson of India Ltd., Stow-in-the-Wold, England, a British company Application September 18, 1953, Serial No. 381,011

2 Claims. (Cl. 172—72)

The present invention relates in general to soft or muddy ground cultivators or cultivator attachments for use on tractors. More particularly, the invention relates to cultivator attachments having cages in the nature of wheels and adapted to be mounted on a tractor in lieu of its usual traction wheels.

It is the general aim of the present invention to provide a cultivator attachment for use on tractors or the like which, on the one hand, prevents bogging down or stalling of the tractor when operated in very soft or muddy, or even flooded, fields; and which, on the other hand, is effective to churn, "puddle," or mix the muddy soil as the tractor advances.

Consonant with the foregoing, another object of the invention is to provide such a cultivator attachment adapted to be mounted in lieu of a tractor's rear wheels and which, nevertheless, may remain on the tractor without stress or damage as the latter is driven over hard ground or roads to different working locations.

A further object is the provision of a soft ground cultivator attachment which churns or puddles two spaced swaths as the driving tractor advances, any ridges on either side of the swaths being thereafter smoothed out to leave a level surface.

Additional objects and advantages will become apparent as the following description proceeds, taken in conjunction with the accompanying drawings, in which:

Figure 1 is a plan view of a cultivator attachment embodying the present invention shown mounted on a tractor, only the rear portion of the latter being illustrated;

Fig. 2 is a side elevation of the attachment and tractor shown in Fig. 1;

Fig. 3 is a side elevation of an attachment cage modified in accordance with another feature of the invention; and Fig. 4 is a plan view, partially in section, of the modified cage shown in Fig. 3.

While the invention has been illustrated and described in some detail with reference to particular preferred embodiments, there is no intention to thereby limit the invention to such details. On the contrary, the intention is to cover all alterations, modifications, and equivalents falling within the spirit and scope of the invention as defined by the appended claims.

The invention finds particular advantage, for example, in the cultivation of rice fields or paddies. The usual steps in the raising of rice are the plowing of the seed bed or paddy with the soil in a dry or semi-dry condition, followed by flooding with water to a depth of about three inches. After the paddy has been soaked with the standing water for three to seven days, it is "puddled," i. e., the saturated and viscous mud is churned and mixed until a very soft and wet consistency is obtained. Green manure is next applied and churned or mixed in with the soft, wet soil, after which young rice plants are transplanted from a nursery bed into the prepared paddy.

Modern tractors and cultivators have thus far proved inadequate for the "puddling" of flooded rice paddies and the churning of manure into the puddled soil. The soil is so soft that the weight of the tractor, plus a plowing or tilling implement carried on it, results in the tractor's becoming bogged down or mired even though its traction wheels are equipped with large, treaded pneumatic tires.

It is to the solution of this difficulty that the present invention is directed.

Referring now more particularly to the exemplary embodiment of the invention here shown, the novel cultivating attachment is illustrated as applied on a well-known tractor, the rear portion of which appears at 10. The attachment includes two wheel-like cages 11 and 12 mounted on the rear axle flanges of the tractor in lieu of the usual rear wheels. The cages themselves form, in effect, broad base traction wheels preventing sinking or bogging of the tractor in wet, muddy fields. The broad bases are formed to serve, in addition, as churning or mixing means operative as the tractor advances.

The tractor may be any one of a wide variety. That partially shown here to make clear the environment of the invention will be recognized by those skilled in the art as the familiar "Ferguson" tractor. It includes at its aft portion a center housing 13 from which live axles 15 extend transversely to present flanges 16 for mounting the usual rear wheels (not shown). The axles 15 extend through axle housings 18 which in turn carry mud guards 19.

Preferably, the tractor is equipped with a power elevatable implement hitch of the type more fully described in Ferguson Patent 2,118,180 and which includes a pair of laterally spaced, forwardly converging hitch links 20 trailingly pivoted at the under sides of the axle housings 18. The hitch links 20 are elevatable by hydraulic means (not shown) acting through crank arms 21 and lift links 22 under the control of a quadrant lever 24. The lateral swing for the hitch links 20 is limited by check chains 25. While the maximum elevation or "transport position" of the hitch links 20 is determined by transport cutoff means associated with the hydraulic controls, any tendency for the links 20 to be rocked beyond the transport position is also resisted by the check chains 25.

Each of the cages 11 and 12 is formed as a generally cylindrical structure of relatively great diameter and axial length. As here shown, each cage comprises an inner rim 30 to which an array of circularly spaced arms or slats 31 are secured to extend in a substantially axial direction. For bracing the outer ends of the slats 31, a ring 32 may be secured to them, thus forming a rigid structure. Preferably, the rim 30 is of greater diameter than the ring 32 so that the slats 31 converge radially inwardly to form a frusto-conical configuration for the cage with its larger diameter innermost or closer to the tractor axle. This assures that when the tractor is driven over hard surfaces or roads the slats 31 have no contact and are not unduly stressed or bent from their original shape. This also precludes relatively great bending moments on the axles 15 and flanges 16.

For connecting the cages 11 and 12 to the axles 15, each cage is provided with a mounting assembly 34 centrally disposed at its larger end. In this instance, a pair of axially spaced hoops 35 and 36 are held coaxially within the slats 31 by a series of reversely angled spokes 38 secured at their one ends to the rim 30 and at their other ends between the hoops. A dished disc 39, which may be of the type conventionally employed with the rim of well-known pneumatic-tired tractor wheels, is fastened to the hoops 35 and 36, as by a plurality of bolts 40 and spacers 41. The disc 39 itself is apertured at its central portion for mounting on the flange 16 by suitable means such as bolts 42.

The connections made between the several elements described, e. g., between the slats 31 and the rim 30 and ring 32, may be formed in any suitable manner. Welding, as indicated, is perhaps the most convenient.

It will be apparent from the foregoing that the cultivator cages 11 and 12 are readily mounted on or removed from the tractor 10 by means of either the bolts 40 or the bolts 42. Once mounted, the tractor may be driven over either soft or hard ground from one work location to another. When the ground is hard the rims 30 support and drive the tractor, leaving the slats 31 free of the ground and immune to bending or other damage. Of primary importance is the double action of the cages 11 and 12 when the tractor is driven through muddy or flooded fields such as rice paddies. The long slats 31 support the tractor, yet churn the ground as the wheels turn. More particularly, the slats if formed of angle iron stock as shown, may have radial portions 31a which knife into the ground, and by reaction, churn it. Circumferential portions 31b, on the other hand, serve as feet limiting the depth to which the radial portions 31a sink.

As the tractor advances through soft ground the cages 11 and 12 churn two relatively wide swaths spaced on either side of the tractor center line. The swaths in mushy ground will be in the nature of channels with windrows thrown up on either side, especially between the two cages. In keeping with another aspect of the invention, means are provided for smoothing such resulting irregularities to thereby leave the ground soft, smooth and ready for receiving plants.

In the present instance such smoothing means include a leveling board 50 adapted to be trailingly raked behind the cages 11 and 12. For trailing connection to the tractor in proper posture, and in order to raise the leveling board 50 to a stowed position when not in use, provision is made for mounting it on the hitch links 20.

The leveling board 50 may be constructed of two elongated planks 51 and 52 spaced fore and aft for attachment along a transverse angle member 54 and interconnected by a series of bracing straps 54a. Preferably, the board 50 extends completely across the tread or width of the tractor and the mounted cages. For connection to the hitch links 20, laterally spaced welded assemblies are secured to the member 54. The assemblies may include angled struts 55 fast at their lower ends with the member 54 and carrying forwardly projecting arms 56 held rigid by diagonal braces 58. Transverse braces 59 may extend from the tops of the struts 55 to the respective end portions of the angle member 54. The arms 56 are interbraced and adapted for connection to the hitch links 20 by a cross bar 60 inserted through matched openings and having end pins 61 inserted through apertured and swiveled balls in the hitch link extremities. Such a connection to the well-known swiveled balls would leave the leveling board 50 free to rock relative to the hitch links 20. Since such rocking is undesired in the present instance in order that the board 50 be maintained at a selected angle of attack, the arms 56 are formed with forward portions 62 extending beyond the cross bar 60 and carrying clamping elements 64. The latter are engageable with the hitch links 20 to constitute the mounting assemblies as rigid extensions from the links.

By positioning the quadrant lever 24, the leveling board 50 may be moved between the elevated transport position (solid lines, Fig. 2) or the operating position (dashed lines, Fig. 2). In the latter position the board 50 is trailed behind the cages 11 and 12 with a forward inclination to rake and smooth any irregularities or windrows produced by the cultivating action of the cages. Another feature of the present leveling arrangement is that it constitutes a safety device precluding rearward overturning of the tractor 10. Inasmuch as the check chains 25 limit the rocking of the hitch links 20, the leveling board 50 serves as a solid foot in the event the tractor 10 tends to tip backward.

Turning now to Figs. 3 and 4, a modified embodiment of the cultivator cages is there shown. Insofar as like parts appear, the same reference characters in Figs. 1 and 2 are employed. One principal difference between this modified cultivator cage and that previously described is the provision of buoyant means for "floating" the tractor should it sink too deeply into very soft mud or deep water. As here shown, an airtight drum 70 is mounted within the cage, being made of a relatively small diameter so that it does not normally contact the surface being worked. The drum 70 may be dished at its inner end 71 to fit over the disc 39, around the hoop 36, and in abutting engagement with the spokes 38. A plurality of straps 72 welded between the ring 32 and the drum 70 hold the latter at its outer ends.

Should the tractor encounter very soft and deep mud or deep water and the cage sink to an inordinate depth, the drum 70 then gives a buoyant force and keeps the tractor from becoming completely stuck. While under such conditions the slats 31 may not be able to exert appreciable traction (due to the light consistency of the mud or water), the tractor is nevertheless held "afloat" so that it may be easily pulled onto more solid ground.

As an added modification, a removable circular shoe 74, L-shaped in cross section, is shown applied around the rim 30. The axial extent of the shoe 74 may be varied as desired in order to provide a broader base for supporting the tractor 10 as it is driven over hard ground between various locations. The shoe may be made of a fairly rigid rubber or plastic material, or of any suitable steel. Preferably, it is formed in two halves for bolting or other expedient fastening to the rim 30 without the necessity of first jacking up the tractor. Through the employment of the shoe 74, the relatively narrow rim 30 does not dig into the road surface and therefore does not subject itself or the road to damage.

I claim as my invention:

1. A soft ground cultivating attachment for a tractor comprising, in combination, an elevatable rear hitch for said tractor including a pair of trailingly pivoted hitch links and check chains limiting their upward rocking, a pair of cage-like structures adapted to be mounted on the tractor in lieu of its rear wheels and having transversely extending circularly spaced arrays of elongated slats made of angle-iron and providing support for the tractor and churning of the ground as the tractor advances, said slats being oriented to present one side in radial relation to said cage for biting engagement with soft ground and the other side in substantially tangential relation to said cage to serve as a foot limiting such biting engagement, a substantially flat leveling and smoothing board, and means adapting said board to be mounted rigidly on said hitch links to extend transversely behind said tractor and cages in forwardly inclined raking contact with the ground, rearward overturning of said tractor being precluded by said board as a foot restrained by said check chains.

2. In a soft ground cultivator attachment for use on tractors or the like, a cage-like structure adapted to be mounted on the tractor's rear axle in lieu of a wheel, said structure including a circular rim and a plurality of circularly spaced elongated L-angle-iron slats extending laterally of said rim to one side only in a substantially axial array from points spaced radially inward from the periphery of said rim, and a circular shoe adapted to be secured around the periphery of said rim and extending axially therefrom to provide a rolling support for the tractor when driven over hard ground, said slats being oriented to present one side in radial relations to said cage for biting engagement with soft ground and the other side in substantially tangential relation to said cage to serve as a foot limiting such biting engagement, said slats extending laterally of said circular shoe and being free of ground contact and any bending stresses when so driven over hard ground, said slats providing traction and a churning action when the tractor is driven over soft ground.

References Cited in the file of this patent

UNITED STATES PATENTS

| | | |
|---|---|---|
| 1,104,934 | Rumely | July 28, 1914 |
| 1,138,148 | Ramsey | May 4, 1915 |
| 1,138,925 | Bartholomew | May 11, 1915 |
| 1,440,183 | Steele | Dec. 26, 1922 |
| 1,530,409 | Raymond | Mar. 17, 1925 |
| 1,672,613 | Howell | June 5, 1928 |
| 1,752,682 | McConnell | Apr. 1, 1930 |
| 1,760,882 | Morrow | June 3, 1930 |
| 1,839,000 | Phan-Quang | Dec. 29, 1931 |
| 2,359,121 | Kinnan | Sept. 29, 1944 |
| 2,398,147 | McKay | Apr. 9, 1946 |
| 2,479,134 | Porter | Aug. 16, 1949 |
| 2,499,746 | Goeiner et al. | Mar. 7, 1950 |
| 2,505,276 | Boroski | Apr. 25, 1950 |
| 2,554,392 | Turner | May 22, 1951 |
| 2,669,173 | Severance | Feb. 16, 1954 |
| 2,719,393 | Bowersox | Oct. 4, 1955 |
| 2,764,925 | Kalla et al. | Oct. 2, 1956 |